US007568423B2

(12) United States Patent
Minowa et al.

(10) Patent No.: US 7,568,423 B2
(45) Date of Patent: Aug. 4, 2009

(54) MAGNET TYPE RODLESS CYLINDER

(75) Inventors: Naoki Minowa, Tokyo (JP); Hiroshi Yoshida, Tokyo (JP); Akiyoshi Horikawa, Tokyo (JP); Mitsuo Noda, Ichinomiya (JP)

(73) Assignees: Howa Machinery, Ltd., Kiyosu-Shi (JP); Koganei Corporation, Tokyo (JP)

( * ) Notice: Subject to any disclaimer, the term of this patent is extended or adjusted under 35 U.S.C. 154(b) by 272 days.

(21) Appl. No.: 11/666,687

(22) PCT Filed: Mar. 14, 2005

(86) PCT No.: PCT/JP2005/004869

§ 371 (c)(1), (2), (4) Date: May 1, 2007

(87) PCT Pub. No.: WO2006/048952

PCT Pub. Date: May 11, 2006

(65) Prior Publication Data

US 2008/0115664 A1 May 22, 2008

(30) Foreign Application Priority Data

Nov. 2, 2004 (JP) ............................ 2004-319677

(51) Int. Cl.
*F15B 15/14* (2006.01)
*F16H 49/00* (2006.01)

(52) U.S. Cl. ........................................................ 92/88

(58) Field of Classification Search ..................... 92/88, 92/169.1

See application file for complete search history.

(56) References Cited

U.S. PATENT DOCUMENTS

| | | | | |
|---|---|---|---|---|
| 4,488,477 | A * | 12/1984 | Miyamoto | 92/85 R |
| 5,844,340 | A * | 12/1998 | Noda | 92/88 |
| 2001/0015580 | A1 * | 8/2001 | Sato et al. | 310/12 |

FOREIGN PATENT DOCUMENTS

| | | | |
|---|---|---|---|
| GB | 470088 | | 8/1937 |
| JP | 06-010914 | | 1/1984 |
| JP | 60-172711 | | 6/1985 |
| JP | 3-44213 | | 4/1991 |
| JP | 4-52606 | | 5/1992 |
| JP | 11082421 | A * | 3/1999 |
| JP | 11093911 | A * | 4/1999 |
| JP | 2002-295414 | | 10/2002 |

* cited by examiner

*Primary Examiner*—Thomas E Lazo
(74) *Attorney, Agent, or Firm*—Finnegan, Henderson, Farabow, Garrett & Dunner, L.L.P.

(57) ABSTRACT

Repulsive magnetic forces in the axial direction of cylinder tubes act between the rows 11 of inner magnets of pistons 10, 10 accommodated in two cylinder tubes 2, 2, and the inner magnets 12 of the pistons 10 come to a halt being slightly deviated relative to the outer magnets 22 in the axial direction of the tube. Due to this deviation, a magnetic holding force Fc is produced between the inner and outer magnets 12, 22. Since the magnetic holding force Fc is produced in a static state, a smooth movement can be attained from a static state suppressing the occurrence of a stick slip phenomenon at the start of movement as compared to the prior art, which does not produce the magnetic holding force in a static state.

5 Claims, 7 Drawing Sheets

(PRIOR ART)

MAGNET TYPE RODLESS CYLINDER

TECHNICAL FIELD

The present invention relates to a magnet-type rodless cylinder in which pistons are magnetically coupled to a slide body on the outer side of a cylinder tube by inner magnets disposed on a plurality of pistons disposed in a plurality of cylinder holes.

BACKGROUND ART

In a conventional magnet-type rodless cylinder as is well known, inner magnets are disposed on a piston accommodated in a tube, and outer magnets or magnetic members are provided in a slide body disposed on the outer side of the tube. The piston and the slide body are coupled together by the magnetic coupling force between the inner magnets and the outer magnets or the magnetic members. As the piston is moved in the tube by a fluid supplied to the tube, such as compressed air, the slide body on the outer side of the tube moves following the piston.

In conventional magnet-type rodless cylinders, in general, the slide body moves based on the movement of the piston (i.e., inner magnets), the slide body being attracted by the moving inner magnets. Here, the magnitude of the attracting force is an index that represents the conveying ability of the magnet type rodless cylinder and is usually called a "magnetic holding force".

FIG. 9 is a sectional view schematically illustrating the structure of a conventional general magnet type rodless cylinder.

Referring to FIG. 9, four outer magnets 102 are arranged in a slide body 101 on the outer side of a tube 100, and four inner magnets 104 are arranged in a piston 103 on the inner side of the tube 100, respectively, holding yokes 105 among them in the axial direction. The four outer magnets 102 and the four inner magnets 104 are so arranged that the same poles oppose each other in the axial direction, the inner magnets 104 and the outer magnets 102 being opposed to each other at their different poles.

Here, the "magnetic holding force" is defined as the force in the axial direction acting on the slide body 101, when the inner magnets 104 are displaced in the axial direction of the tube, relative to the slide body 101 (outer magnets 102) by exerting fluid pressure on the piston 103 while the slide body 101 is fixed, so that the slide body does not move in the axial direction.

In a static state where no fluid pressure is applied as shown in FIG. 4B, i.e., in a state where the four inner magnets 104 and the four outer magnets 102 are at positions, which are in alignment with each other in the radial direction without being deviated in the axial direction, the magnetic holding force becomes zero at point A. The magnetic holding force increases with an increase in the deviation between the inner magnets 104 and the outer magnets 102 in the axial direction, and becomes maximum Max (point B) when the deviation is about one-half the pitch L of the arrangement of the magnets 102, 104 in the axial direction.

According to another conventional magnet-type rodless cylinder as shown in FIG. 10, outer magnets are omitted by using a magnetic material for forming the slide body 101 and protuberances 101*a* which oppose the yokes 105 is provided for the slide body 101. In the magnet type rodless cylinder of this type, magnetic holding force is zero in a state where no fluid pressure is exerted.

Japanese Registered Utility Model No. 2514499 discloses a magnet type rodless cylinder in which a plurality of cylinder tubes are arranged in parallel, pistons are disposed in the cylinder holes in the cylinder tubes, a slider is arranged so that it strides all tubes, and the plurality of pistons are magnetically coupled to the slider.

However, in the above conventional magnet-type rodless cylinders, the inner magnets 104 and the outer magnets 102 in a static state are at rest where the magnets attract each other in the radial direction and are in alignment. That is, no displacement (deviation) occurs in the axial direction between the inner magnets 104 and the outer magnets 102, and magnetic holding force is zero as described with reference to FIG. 4B.

Therefore, if the piston 103 is attempted to be moved in this state, no driving force is exerted on the outer magnets 102 until a "deviation" occurs in the axial direction. Therefore, conventional magnet-type rodless cylinders lack smoothness in the movement due to a stick-slip phenomenon at the start of the slide body 101. The above problem also occurs in the rodless cylinder of the structure omitting the outer magnets as shown in FIG. 10.

In the magnet-type rodless cylinder of the above Japanese Registered Utility Model No. 2514499, further, the plurality of cylindrical tubes are arranged maintaining a considerable distance therebetween, and the inner magnets of the pistons accommodated in the respective cylindrical tubes do not exert magnetic force on each other. Accordingly, the inner magnets of the pistons are in alignment with the outer magnets of the slide body completely facing them in the radial direction, and are presumably not deviated in the axial direction. Therefore, the above stick-slip problem occurs.

DISCLOSURE OF THE INVENTION

In view of the above problem in the prior art, it is an object of the present invention to provide a magnet-type rodless cylinder, which is capable of smoothly moving the slide body in the initial stage of movement.

In order to achieve the above object, according to the present invention, there is provided a magnet-type rodless cylinder comprising a cylinder tube made of a nonmagnetic material; pistons accommodated in a plurality of cylinder holes formed in parallel in the cylinder tube so as to move therein; inner magnets arranged in the plurality of pistons; and a slide body arranged on the outer side of the cylinder tube so as to move in the axial direction of the cylinder tube, and is magnetically coupled to the inner magnets of the pistons; wherein the cylinder holes are arranged close to each other so as to produce repulsive magnetic forces in the axial direction of the cylinder tube among the inner magnets of the pistons so that the pistons are held at positions deviated relative to each other in the axial direction of the cylinder tube.

According to another aspect of the present invention, there is provided a magnet-type rodless cylinder comprising a plurality of cylinder tubes arranged in parallel with each other and made of a nonmagnetic material; pistons accommodated in cylinder holes formed in the cylinder tubes so as to move in the axial direction of the cylinder tubes; inner magnets arranged in the plurality of pistons; and a slide body arranged surrounding the cylinder tubes so as to move in the axial direction of the cylinder tubes, and is magnetically coupled to the inner magnets of the pistons; wherein the cylinder tubes are arranged close to each other so as to produce repulsive magnetic forces in the axial direction of the cylinder tubes among the inner magnets of the pistons so that the pistons are held at positions deviated relative to each other in the axial direction of the cylinder tubes.

In the above invention, it is desirable that the cylinder tubes be separate circular cylinder tubes, or the outer circumferences of the cylinder tubes are joined together. The circular cylinder tubes may be separated from each other within a range in which a repulsive magnetic force acts upon the pistons.

That is, in the present invention, in a state where no internal pressure is acting on the pistons accommodated in the plurality of cylinder holes, the pistons which are magnetically coupled to the slide body are deviated in the axial direction of the tubes and are producing a magnetic holding force. Therefore, when the internal pressure is acted upon the pistons, the slide body can be smoothly moved from a halted state.

The cylinder thrust varies in proportion to the total cross sectional area of the plurality of cylinder holes. Therefore, when the rodless cylinder of a large cylinder thrust is not required, a plurality of cylinder holes having small cross sectional areas may be arranged in parallel. Furthermore, in the present invention, by arranging the cylinder holes close to each other, the height of the slide body can be decreased, and the width of the slide body can be decreased as compared to that of the prior art in which the cylinder holes are not arranged close to each other, when a plurality of cylinder holes are arranged in parallel in the horizontal direction. Therefore, the cylinders as a whole become flat and compact.

By forming the cylinder tubes as circular cylinder tubes, the movement is smoother, and by joining the outer circumferences of the cylinder tubes, a stable and close arrangement is attained.

Further, the cylinder tube may be of the shape of a flat ellipse in cross section having a major axis and a minor axis, and a plurality of cylinder holes may be arranged in the direction of the major axis thereof close to each other in parallel in the cylinder tube.

BRIEF DESCRIPTION OF THE DRAWINGS

FIGS. 4A and 4B are a view and diagram illustrating the deviation of the inner and outer magnets and the magnetic holding force, wherein FIG. 4A illustrates the magnet-type rodless cylinder according to the present invention and FIG. 4B is a diagram of the relationship between the deviation of the inner and outer magnets and the magnetic holding force;

BEST MODE FOR CARRYING OUT THE INVENTION

Figure 2:
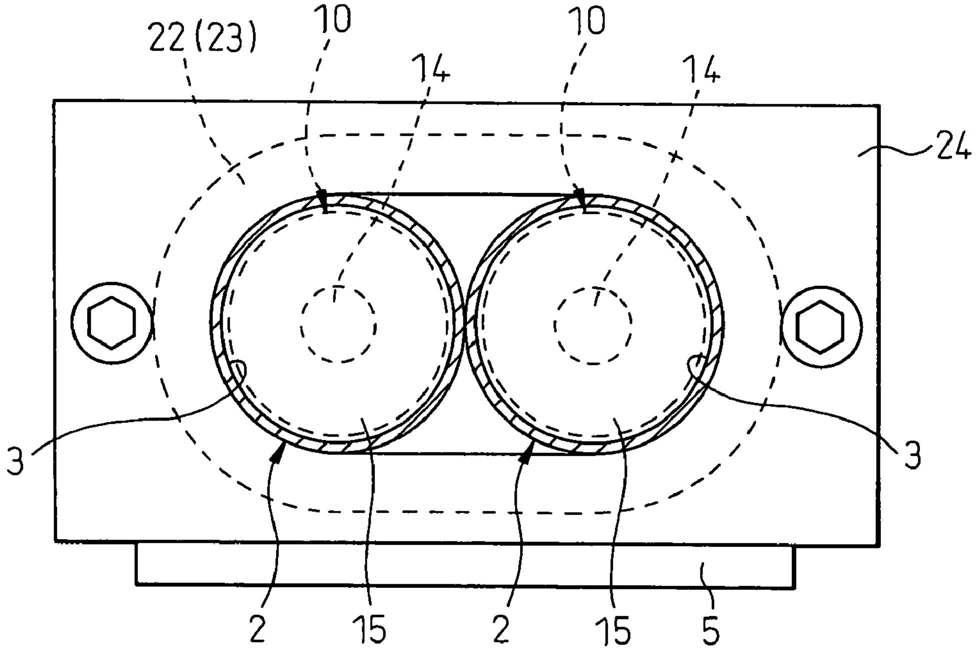
FIG. 2 is a sectional view along the line II-II in FIG. 1.
Figure 3:
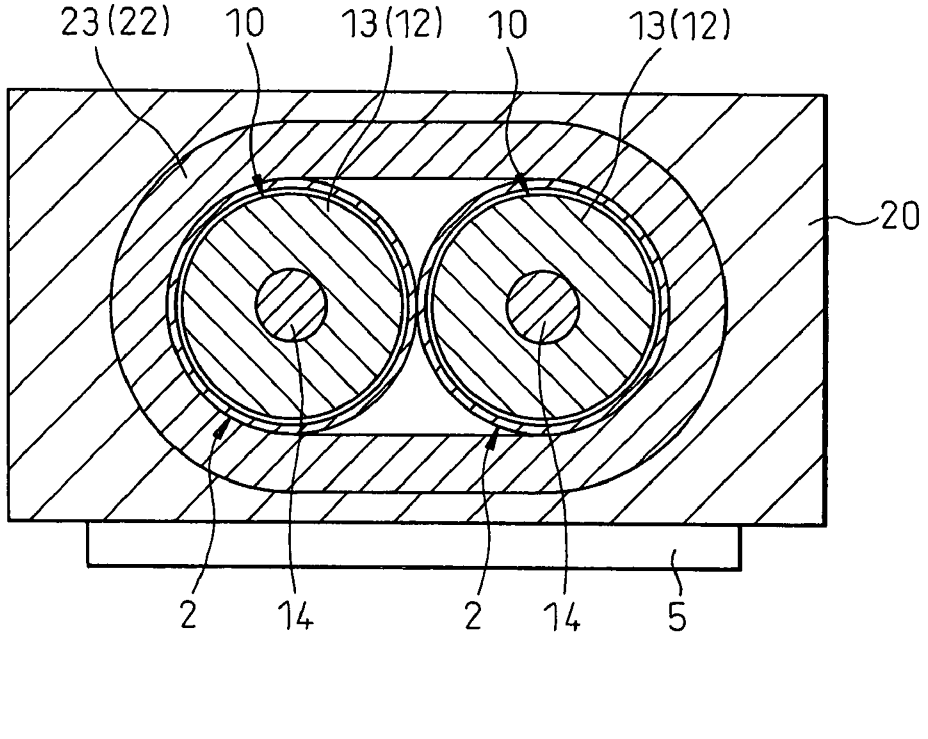
FIG. 3 is a sectional view along the line III-III in FIG. 1.

An embodiment of the magnet-type rodless cylinder of the invention will now be described with reference to FIGS. 1 to 3.

Figure 1:
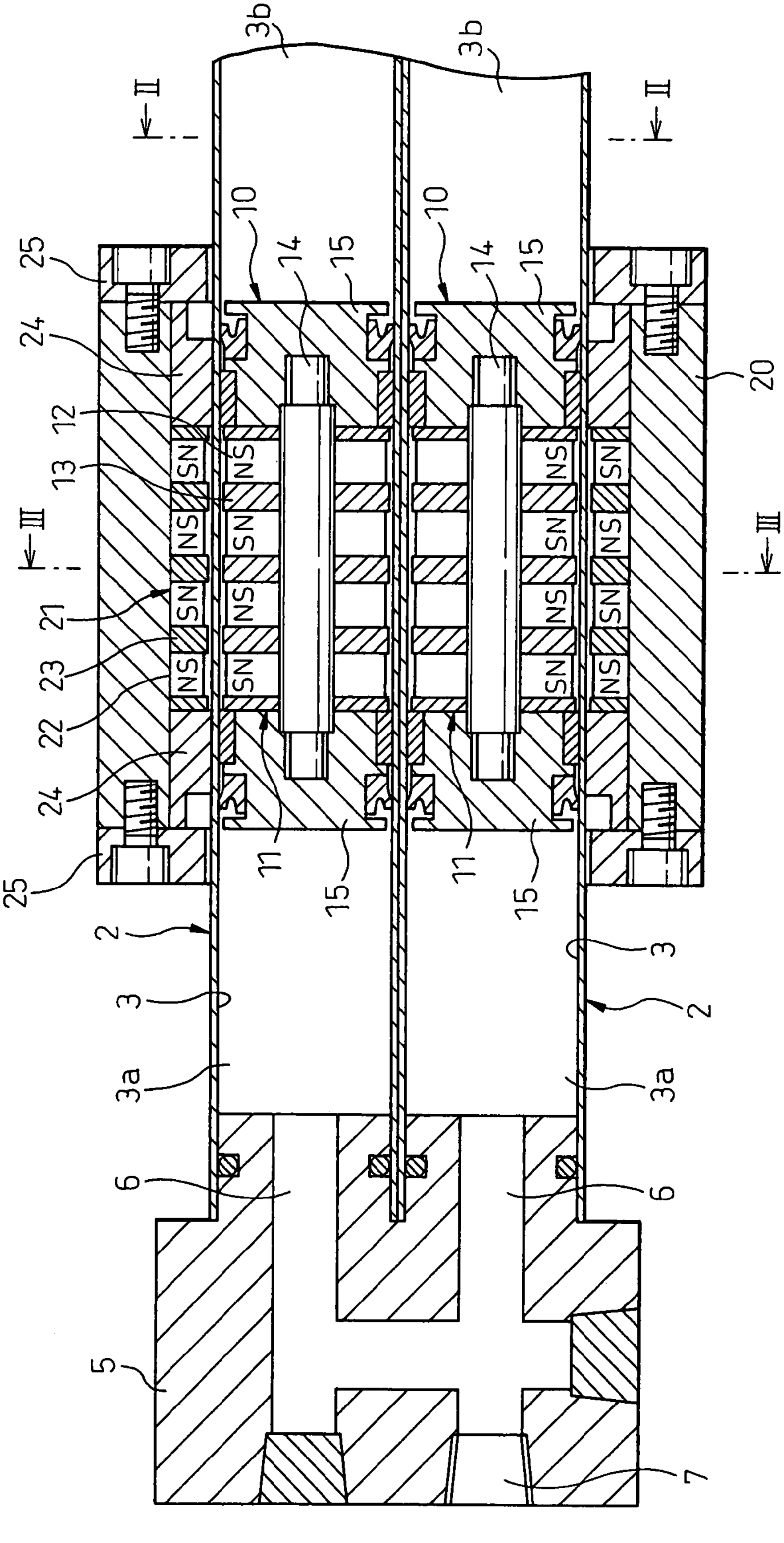
FIG. 1 is a longitudinal sectional view of a magnet type rodless cylinder according to an embodiment of the invention.

In FIG. 1, the magnet-type rodless cylinder 1 includes a plurality of (two in this case) cylinder tubes 2. In this embodiment, the cylinder tubes 2 are cylindrical tubes having an exactly circular outer circumferential shape, and include therein cylinder holes 3 of an exactly circular shape in cross section extending in the axial direction of the tubes. The plurality of cylinder tubes 2 are arranged in parallel with portions of their outer circumferential surface being in contact with each other.

The cylinder thrust varies in proportion to the cross sectional areas of the pistons, i.e., varies in proportion to the cross sectional areas of the cylinder holes 3 of the cylinder tubes 2. Therefore, when the cylinder thrust is set to be the same as that of the conventional magnet-type rodless cylinder employing only one cylinder tube, the cross sectional areas of the respective cylinder tubes 2 of this embodiment can be half of that of the conventional magnet-type rodless cylinder, and the diameter can be decreased. Therefore, by setting the sizes of the slide body 20 and end caps 5 described later appropriately so that they match the diameter of the cylinder tubes 2, the entire configuration of the magnet-type rodless cylinder can be flattened.

If three or more cylinder tubes 2 are aligned so that the outer circumferences are in contact, it is possible to obtain a rodless cylinder, which is flatter and has a smaller thickness (height).

The contact portion of the outer circumferences of the cylinder tubes 2 are integrally joined together by various means, such as adhesion, welding or the like. Regarding the closeness degree of the cylinder tubes (cylinder holes) 2, 2, the two cylinder tubes may be completely in contact, or may be close to each other to a sufficient degree, such that a repulsive force is produced in the axial direction among the inner magnets 12 of the pistons 10, when the pistons 10 are being fitted in the cylinder holes 3, 3 of the two cylinder tubes 2. As will be described later, the inner magnets 12 of the pistons 10 are slightly deviated in the axial direction relative to the outer magnets 22 of the slide body 20.

Figure 5:
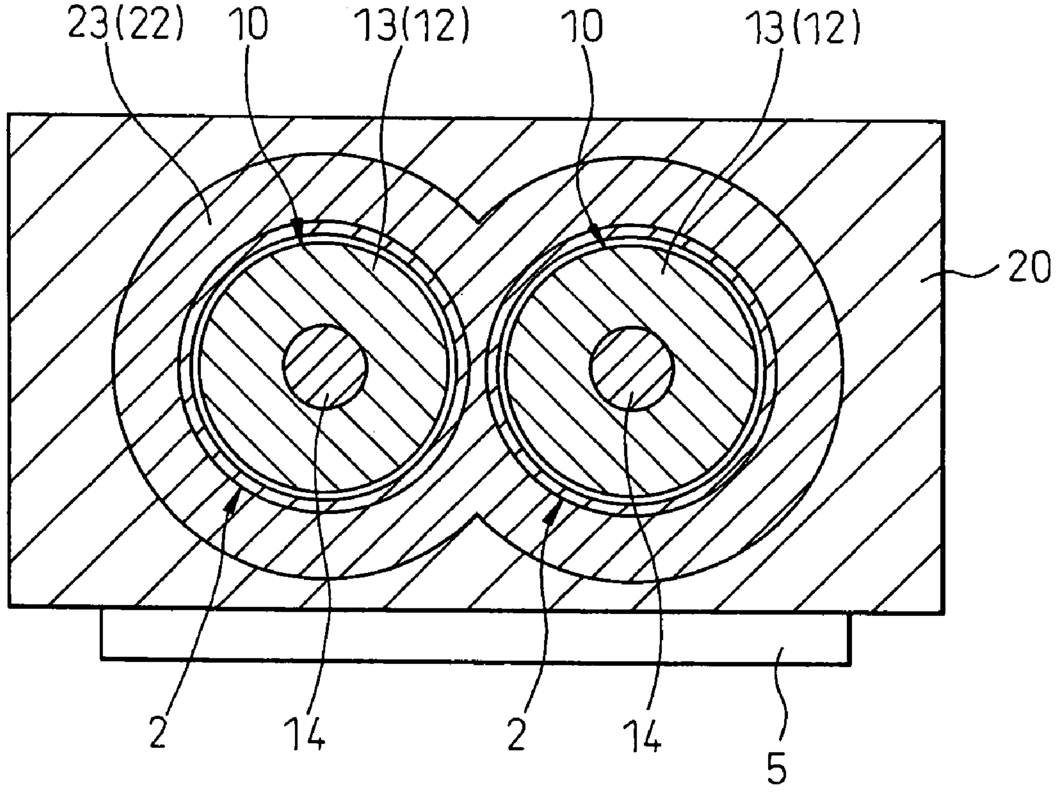
FIG. 5 is a sectional view similar to FIG. 3 illustrating a second embodiment.

Therefore, cylinder tubes 2 and 2 may be separately mounted with a gap between the outer circumferences as shown in FIG. 5, instead of joining the outer circumferences of the two cylinder tubes 2 and 2 by for example, an adhesive. Each cylinder tube 2 is made of a nonmagnetic material such as a drawn or extruded m aluminum alloy or stainless steel, and end caps 5 are fitted to the ends of the cylinder tubes 2, 2 in the lengthwise direction thereof to close the two cylinder holes 3, 3.

The end caps 5 are of a flat shape, which is long in the direction in which the cylinder tubes are arranged (direction along the straight lines connecting the centers of circles in cross section of the two cylinder tubes), and is short in the direction of thickness (direction of axes of the cylinders). On the end caps 5, a supply/discharge port 7 for the fluid, as well as flow paths 6, 6 communicated with the cylinder holes 3, 3 are formed.

The cylinder holes 3, 3 accommodate the pistons 10 so that they move in the axial direction, and the cylinder holes 3, 3 are sectionalized into right and left chambers 3a, 3b by the pistons 10. In FIG. 1, reference numeral 11 denotes the row of inner magnets of the pistons 10. The row 11 of inner magnets is constituted by inner magnets 12 of four pieces of permanent magnets of the shape of a doughnut shape having a circular circumference, and yokes 13. The inner magnets 12 and the yokes 13 which are alternately fitted onto a piston shaft 14, and are fastened and fixed at both ends in the axial direction by piston ends 15.

Referring to FIG. 1, the magnetic poles of the inner magnets 12 are arranged so that the same poles are opposed to each other among the inner magnets 12 neighboring each other in the axial direction, for example SN, NS, SN, NS, and the same poles are opposed to each other among the inner magnets 12 of the neighboring pistons 10, 10.

The slide body 20 is made of an aluminum alloy and is arranged so as to move on the outer circumferential surfaces of the cylinder tubes 2, 2 in the axial direction. A row 21 of outer magnets is provided on the inner circumferential surface of the slide body 20.

The slide body 20 is of a flat shape, which is long in a direction in which the cylinder tubes are lined, and is short in the direction of thickness, which is at right angles with the direction in which the cylinder tubes are lined.

The row 21 of outer magnets is formed by four pieces of outer magnets 22 and yokes 13 alternately arranged in the axial direction, and are fixed by fastening the end plates 25 against outer wear rings 24 disposed on both ends of the row 21. The outer magnets 22 are permanent magnets having the shape of an oblong circular ring in order to permit the two cylinder tubes 2 to penetrate therethrough in the axial direction, and the yokes 13 have the shape of an oblong circular ring which is similar to the permanent magnets.

The magnetic poles of the row 21 of outer magnets, are arranged so that the poles thereof oppose the same poles of neighboring outer magnets 22 in the axial direction, but the magnetic poles thereof oppose the opposite magnetic poles of the row 11 of inner magnets, for example NS, SN, NS, SN.

That is, row 11 of inner magnets and row 21 of outer magnets attract each other to magnetically couple the two pistons 10 with the slide body 20. Conversely, between the rows 11, 11 of inner magnets of the pair of neighboring pistons 10, 10, the repulsive magnetic force is acting in the direction in which the cylinders are arranged in parallel (direction along the line connecting the centers of circles in cross section of the two cylinder tubes), as well as in the axial direction of the tubes.

Due to the repulsive magnetic force in the axial direction of the tubes, the inner magnets 12 of the pistons 10 in a static state are held at positions slightly deviated relative to the outer magnets 22 in the axial direction of the tubes.

Figure 4A:
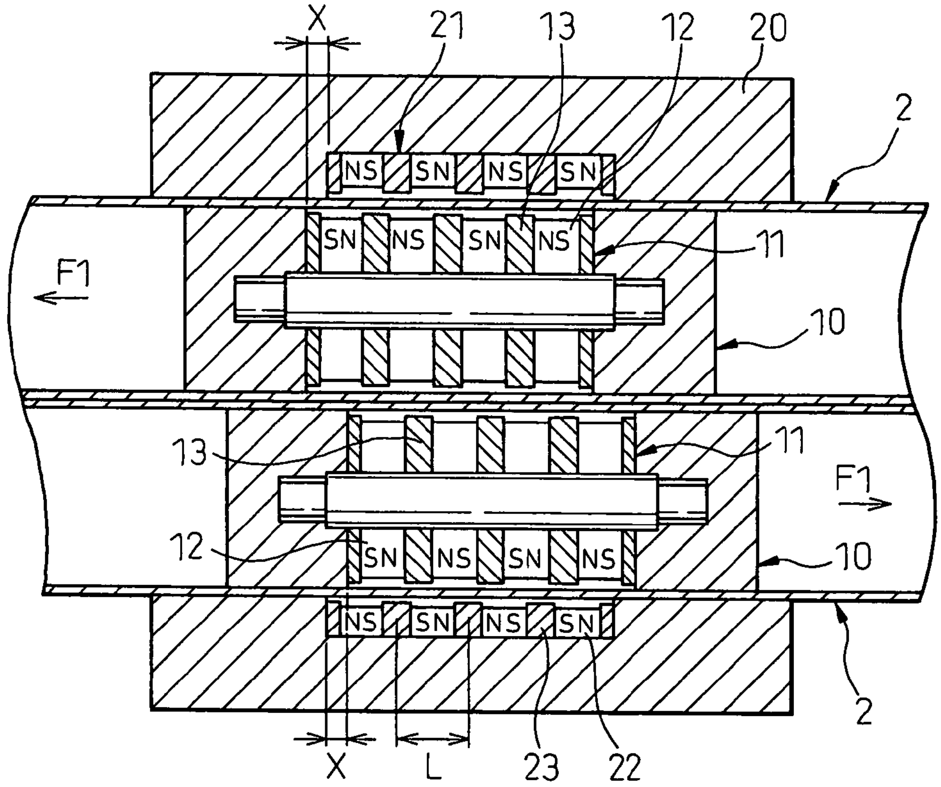
Figure 9:
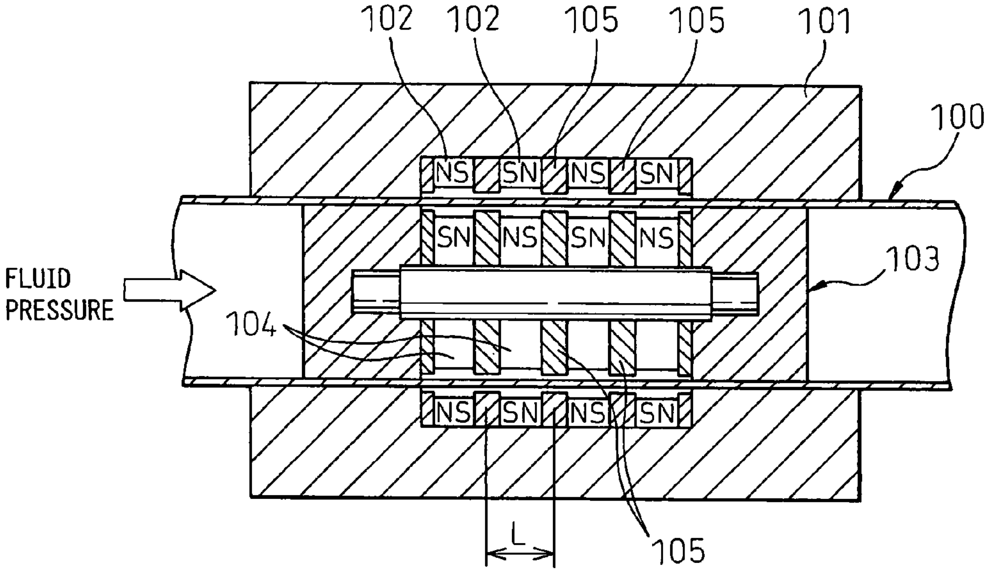
FIG. 9 is a sectional view of a conventional magnet type rodless cylinder and illustrates the deviation of the inner and outer magnets and the magnetic holding force.
Figure 10:
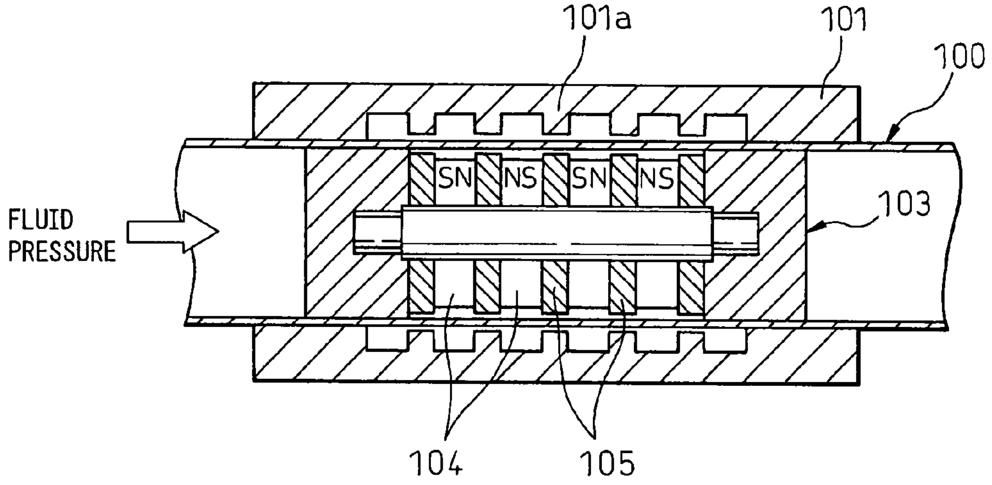
(PRIOR ART) Fig.10
FIG. 10 is a sectional view of another conventional magnet type rodless cylinder.

FIG. 4A is a view illustrating the above deviated state in an exaggerated manner. In the static state, the two neighboring pistons 10, 10 accommodated in the cylinder holes 3, 3 of the cylinder tubes 2, 2 arranged in parallel receive a repulsive magnetic force F1 in the axial direction of the tube on their inner magnets 12 due to the above magnetic pole arrangement. Because of the repulsive magnetic force F1, the inner magnets 12, 12 of the pistons 10, 10 do not stay at rest at positions where they are in alignment with the outer magnets 22 of the slide body 20 (e.g., positions of FIG. 9). Therefore, the pitons 10, 10 remain at rest at positions deviated from the slide body 20 by "X" in the axial direction.

Figure 4B:
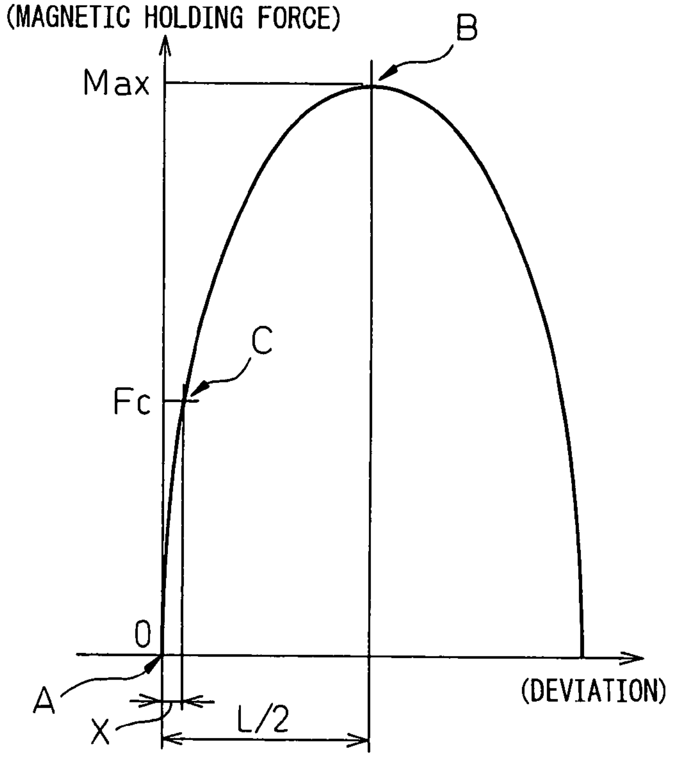

In this embodiment, since the pistons 10, 10 are at rest at positions deviated from the slide body 20 by "X", a magnetic holding force Fc corresponding to the deviation "X" is produced between the inner magnets 12 and the outer magnets 22 even in a static state as represented by a point C in FIG. 4B.

In this state, if compressed air is supplied into the cylinder chambers 3*a* or 3*b* into the cylinder tubes 2, 2 through the port 7 formed in the end cap 5, the two pistons 10 start moving in the cylinder tubes 2, and the slide body 20 magnetically coupled to the pistons 10, 10 start moving on the outer side of the cylinder tubes 2. However, in this embodiment, since the magnetic holding force Fc is produced between the outer magnets 22 and the inner magnets 12 even in a static state, the stick slip phenomenon at the start of motion is suppressed and a smooth movement can be obtained as compared to the conventional case (FIG. 9) where the magnetic holding force is not produced in a static state.

In the parallel arrangement of the cylinder tubes 2, 2 of the magnet type rodless cylinder 1 of this embodiment as described above, the distance between the cylinder tubes is set so that the pistons 10, 10 accommodated in the cylinder tubes 2, 2 will receive the repulsive magnetic force by the inner magnets 12 of the pistons 10, 10 so as to be deviated in the axial direction of the cylinder tubes.

With the cylinder tubes 2, 2 being arranged close to each other, the pistons 10, 10 are deviated in the axial direction of the cylinder tubes even in a static state (a state in which no pressure is acting on the cylinder chambers 3*a*, 3*b*), and a magnetic holding force generates between the pistons and the slide body 20 in a static state. Therefore, the magnet-type rodless cylinder 1 of this embodiment starts smoothly even when the internal pressure is acted on in the cylinder chambers 3*a*, 3*b* in a state in which the pistons 10 are halted.

The cylinder thrust varies in proportion to the total cross sectional area of the cylinder holes 3, 3. Therefore, according to this embodiment, when the rodless cylinder does not have to produce a great cylinder thrust, the cylinder holes of small cross sectional areas may be arranged in a plural number in parallel in the horizontal direction. In this embodiment, the cylinder tubes are arranged close to each other. Therefore, the slide body 20 can be formed having a decreased width and decreased height, and the cylinder as a whole can be formed in a flat and compact shape.

Figure 6:
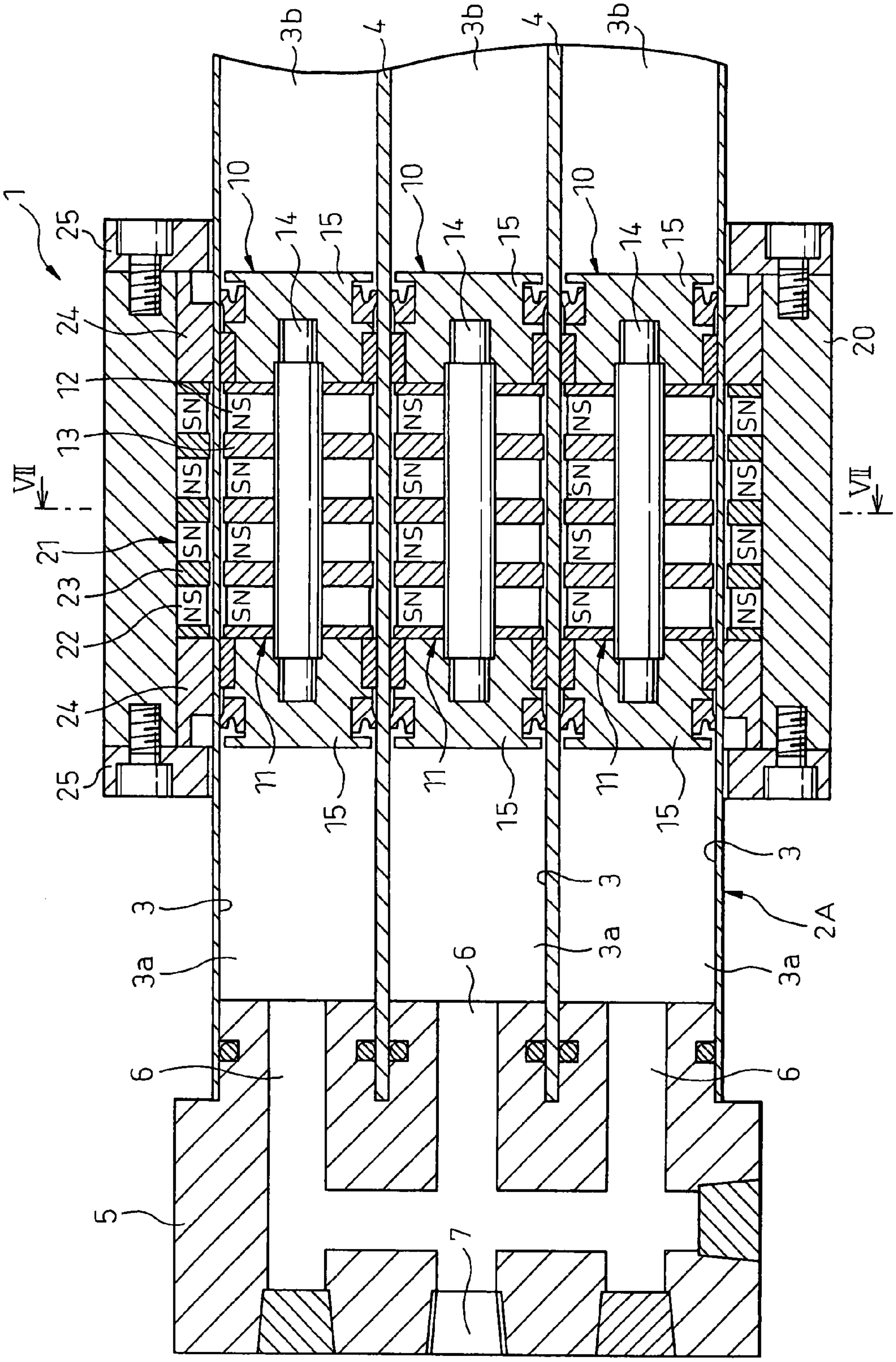
FIG. 6 is a longitudinal sectional view of the magnet type rodless cylinder according to a third embodiment.
Figure 7:
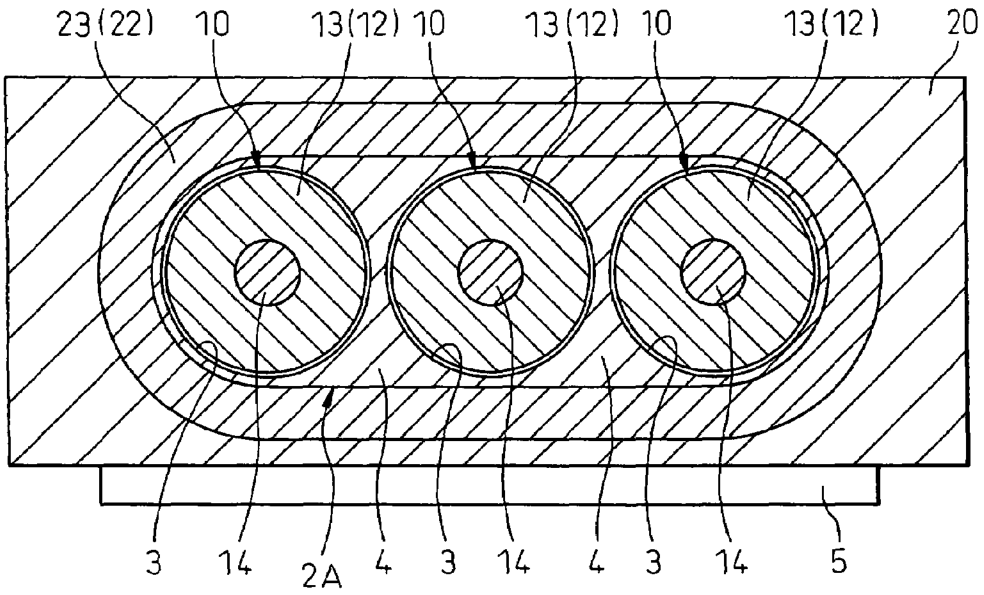
FIG. 7 is a sectional view along the line VII-VII in FIG. 6.
Figure 8:
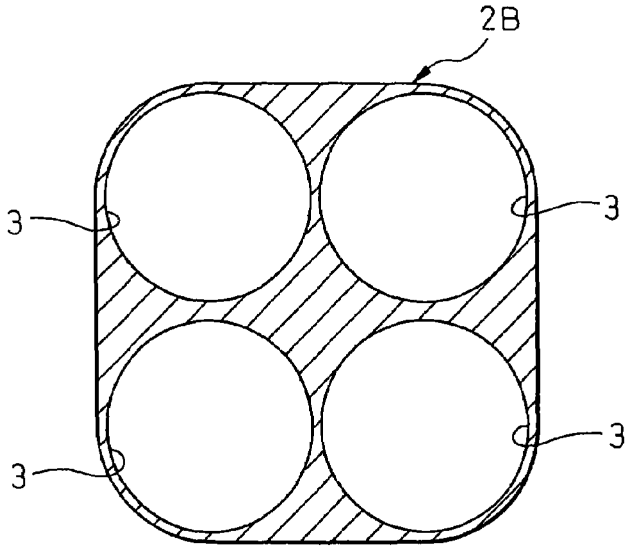
FIG. 8 is a sectional view of the cylinder tube according to another embodiment.

Next, described below with reference to FIGS. 6 to 8 are further embodiments of the invention in which a plurality of cylinder holes are formed in parallel with each other in a single cylinder tube. In FIGS. 6 to 8, the same elements as those of the above embodiment are denoted by the same reference numerals and their description is not repeated hereafter.

In the embodiment shown in FIGS. 6 and 7, the cylinder tube 2A is of a flat oblong circular shape having a major axis and minor axis in the outer circumference of the cross section, and in which a plurality of (three in this case) circular cylinder holes 3, 3, 3 of the same shape are lined in parallel via partitioning walls 4 close to each other maintaining an equal gap in the direction of the major axis.

Like in the above embodiment, the slide body 20 in this embodiment is arranged surrounding the outer circumference of the cylinder tube 2A so as to move in the axial direction, and pistons 10 are arranged in the three cylinder holes 3 so as to move in the axial direction. In this embodiment, the cylinder holes are arranged close to each other so that, in a static state, repulsive magnetic forces acting in the axial direction are produced among the inner magnets 12 of the pistons, and thereby, the inner magnets 12 of the pistons 10 are slightly deviated in the axial direction relative to the outer magnets 22 of the slide body 20.

FIG. 8 is a sectional view of a cylinder tube 2 in which four cylinder holes are arranged.

In the above embodiments, the cylinder holes can take various shapes such as a rectangular shape or a triangular shape in addition to a circular shape. Further, the shapes of the pitons, slide body, inner magnets and outer magnets may be suitably varied to meet the sectional shape of the cylinder tubes. Further, the slide body may not need to have the outer magnets provided if it is made of a magnetic material that can be magnetically coupled to the inner magnets.

The invention claimed is:

1. A magnet-type rodless cylinder comprising:

a cylinder tube (2) made of a nonmagnetic material;

pistons (10, 10) accommodated in a plurality of cylinder holes (3, 3) formed in parallel in said cylinder tube (2) so as to move therein;

inner magnets (12, 12) arranged in said plurality of pistons; and a slide body (20) arranged on the outer side of said cylinder tube so as to move in the axial direction of the cylinder tube, and is magnetically coupled to the inner magnets of the pistons; wherein, said cylinder holes (3, 3) are arranged close to each other so as to produce repulsive magnetic forces in the axial direction of the cylinder tube among the inner magnets (12, 12) of the pistons so that the pistons (10, 10) are held at positions deviated relative to each other in the axial direction of the cylinder tube.

2. A magnet-type rodless cylinder comprising:

a plurality of cylinder tubes (2, 2) arranged in parallel with each other and made of a nonmagnetic material;

pistons (10, 10) accommodated in cylinder holes (3, 3) formed in the respective cylinder tubes (2, 2) so as to move in the axial direction of the cylinder tubes;

inner magnets (12, 12) arranged in said plurality of pistons; and a slide body (20) arranged surrounding said cylinder tubes so as to move in the axial direction of the cylinder tubes, and is magnetically coupled to the inner magnets of said pistons; wherein, said cylinder tubes are arranged close to each other so as to produce repulsive magnetic forces in the axial direction of the cylinder tubes among the inner magnets (12, 12) of said pistons so that the pistons (10, 10) are held at positions deviated relative to each other in the axial direction of the cylinder tubes.

3. The magnet-type rodless cylinder according to claim 2, wherein said cylinder tubes are circular cylinder tubes.

4. The magnet-type rodless cylinder according to claim 2 or 3, wherein the outer circumferences of said cylinder tubes are joined together.

5. The magnet-type rodless cylinder according to claim 1, wherein said cylinder tube is of an oblong circular shape in cross section having a major axis and a minor axis, and said plurality of cylinder holes have a circular shape in cross section and are arranged close to each other and in parallel with each other in the direction of major axis in cross section of the cylinder tube.

* * * * *